United States Patent
Heo et al.

(10) Patent No.: US 9,613,025 B2
(45) Date of Patent: Apr. 4, 2017

(54) NATURAL LANGUAGE QUESTION ANSWERING SYSTEM AND METHOD, AND PARAPHRASE MODULE

(71) Applicant: Electronics and Telecommunications Research Institute, Daejeon (KR)

(72) Inventors: Jeong Heo, Daejeon (KR); Young Rae Kim, Daejeon (KR); Hyun Ki Kim, Daejeon (KR); Pum Mo Ryu, Daejeon (KR); Yong Jin Bae, Daejeon (KR); Hyo Jung Oh, Daejeon (KR); Chung Hee Lee, Daejeon (KR); Hyung Jik Lee, Daejeon (KR); Soo Jong Lim, Daejeon (KR); Joon Ho Lim, Daejeon (KR); Myung Gil Jang, Daejeon (KR); Mi Ran Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/945,921

(22) Filed: Nov. 19, 2015

(65) Prior Publication Data
US 2016/0140958 A1    May 19, 2016

(30) Foreign Application Priority Data
Nov. 19, 2014    (KR) .................. 10-2014-0161859

(51) Int. Cl.
*G06F 17/27*    (2006.01)
*G06F 17/30*    (2006.01)
*G06F 17/28*    (2006.01)

(52) U.S. Cl.
CPC ...... *G06F 17/2785* (2013.01); *G06F 17/2795* (2013.01); *G06F 17/289* (2013.01); *G06F 17/30864* (2013.01)

(58) Field of Classification Search
CPC .... G06F 17/28; G06F 17/2795; G06F 17/289; G06F 17/30864; G10L 15/22
See application file for complete search history.

(56) References Cited

U.S. PATENT DOCUMENTS 7,937,265 B1 * 5/2011 Pasca .................. G06F 17/2775
                                                       704/1
8,554,540 B2    10/2013 Lee et al.
(Continued)

FOREIGN PATENT DOCUMENTS

KR        100546743 B1    1/2006
KR     1020130116128 A   10/2013

OTHER PUBLICATIONS

Gale, William A., and Kenneth W. Church. "A program for aligning sentences in bilingual corpora." Computational linguistics 19.1 (1993): 75-102.*

(Continued)

*Primary Examiner* — Matthew Baker
(74) *Attorney, Agent, or Firm* — William Park & Associates Ltd.

(57) ABSTRACT

A natural language question answering system and method, and a paraphrase module are provided. The natural language question answering system includes a conversion module configured to generate a plurality of modified questions by paraphrasing a user's question; a plurality of question answering engines configured to receive each of the user's question and the modified questions, and select candidate answers corresponding to each of the user's question and the modified questions; and a detection module configured to detect at least one among the selected candidate answers as an answer.

15 Claims, 5 Drawing Sheets

(56) References Cited

U.S. PATENT DOCUMENTS

| | | |
|---|---|---|
| 8,744,837 B2 | 6/2014 | Heo et al. |
| 2008/0040339 A1 | 2/2008 | Zhou et al. |
| 2010/0145673 A1* | 6/2010 | Cancedda ............. G06F 17/289 704/3 |
| 2010/0145694 A1* | 6/2010 | Ju ....................... G10L 15/1815 704/235 |
| 2012/0178057 A1* | 7/2012 | Yang ..................... G09B 19/06 434/157 |
| 2016/0140958 A1* | 5/2016 | Heo ................... G10L 15/1822 704/9 |

OTHER PUBLICATIONS

Jeon, Jiwoon, W. Bruce Croft, and Joon Ho Lee. "Finding similar questions in large question and answer archives." Proceedings of the 14th ACM international conference on Information and knowledge management. ACM, 2005.*

Sekine, Satoshi, and Ralph Grishman. "Hindi-English cross-lingual question-answering system." ACM Transactions on Asian Language Information Processing (TALIP) 2.3 (2003): 181-192.*

D. A. Ferrucci, "Introduction to 'This is Watson'," IBM Systems Journal, May/Jul. 2012, pp. 1-15, vol. 56 No. 3/4, IBM.

* cited by examiner

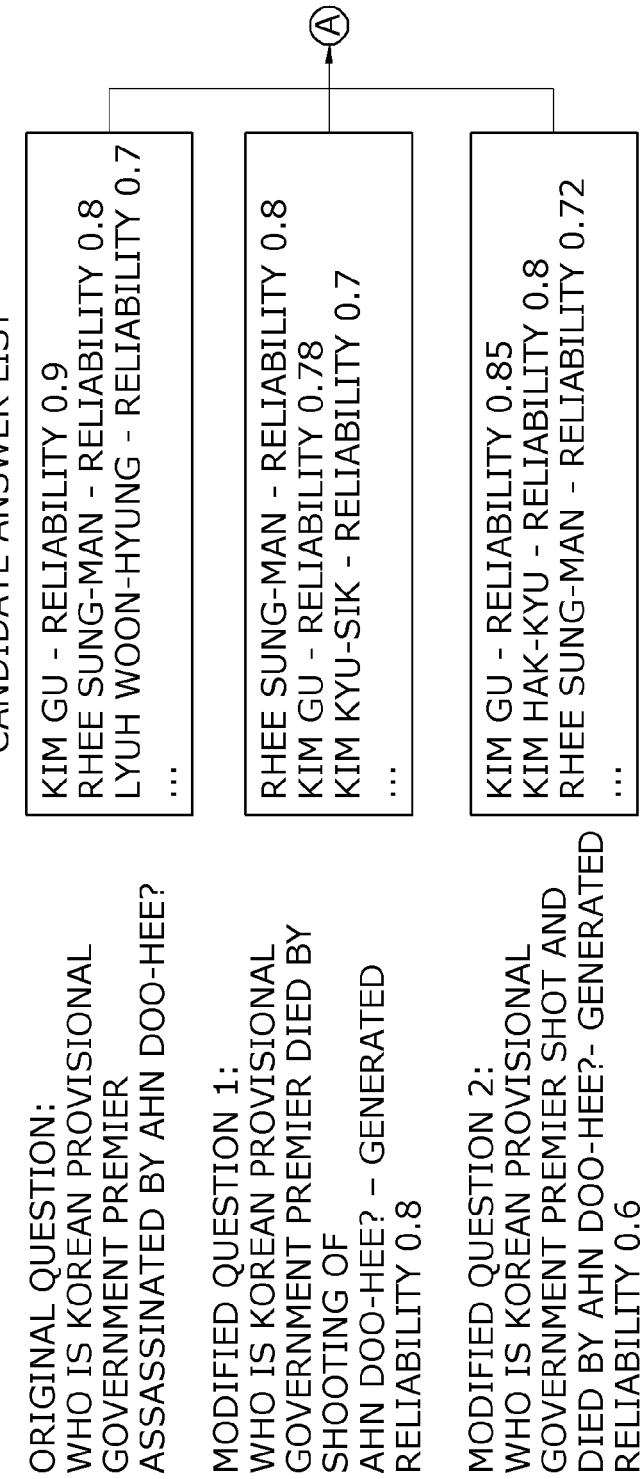

FIG. 3B

COMBINED ANSWER

KIM GU: (1*0.9 + 0.8*0.78 + 0.6*0.85)/3 = 0.678
RHEE SUNG-MAN: (1*0.8 + 0.8*0.8 + 0.6*0.72)/3 = 0.624
LYUH WOON-HYUNG: (1*0.7)/3 = 0.233
KIM KYU-SIK: (0.8*0.7)/3 = 0.187
KIM HAK-KYU: (0.6*0.89)/3 = 0.16

Ⓐ

NATURAL LANGUAGE QUESTION ANSWERING SYSTEM AND METHOD, AND PARAPHRASE MODULE

CROSS-REFERENCE TO RELATED APPLICATION

This application claims priority to and the benefit of Korean Patent Application No. 2014-0161859, filed on Nov. 19, 2014, the disclosure of which is incorporated herein by reference in its entirety.

BACKGROUND

1. Field of the Invention

The present invention relates to question answering technology, and more particularly, to a natural language question answering system and method, and a paraphrase module capable of detecting an answer to a user's question.

2. Discussion of Related Art

Natural language question answering technology is technology of analyzing a user's question, searching for answers suitable for an intension of the question in various contents, extracting the answer among them, and providing the extracted answer to the user.

Together with the advent of a mobile era, the natural language question answering technology has been again spotlighted in order to overcome a hardware limitation (a limitation of search result display due to a small screen) of a mobile device.

While suggesting technology named "siri" for the iPhone, technology of asking a question with a user's voice and answering to the question had been introduced.

Conventional natural language question answering technology includes a question analysis operation of analyzing a user's question, a document search operation of searching for related content, an answering extraction operation of extracting an answer in the searched document, and an answer suggestion operation of suggesting the extracted answer.

The conventional natural language question answering technology is a method of searching for a sentence or a paragraph having the same sentence structure and word as the question based on data redundancy of big data, and finding an candidate answer in a corresponding sentence or paragraph.

Basically, the method is based on an assumption that the content having the same sentence structure and word as the user's question exists anywhere on a widespread Web. However, this approach method is based on the big data named the Web, and a filtering on false information which is a disadvantage of the Web is prerequisite for the approach method.

Also, the conventional natural language question answering may be performed based on limited content having high reliability such as an encyclopedia, a Wikipedia dictionary, a Korean dictionary, etc., but in this case, since there is a limitation of searching for the sentence and the paragraph including the answer, a recall ratio and accuracy may become lowered.

SUMMARY OF THE INVENTION

The present invention is directed to a natural language question answering system and method, and a paraphrase module capable of paraphrasing a user's question, and searching for an answer corresponding to the question.

The technical objectives of the present invention are not limited to the above disclosure; other objectives may become apparent to those of ordinary skill in the art based on the following descriptions.

According to one aspect of the present invention, there is provided a natural language question answering system, including: a conversion module configured to generate a plurality of modified questions by paraphrasing a user's question; a plurality of question answering engines configured to receive each of the user's question and the modified questions, and select candidate answers corresponding to each of the user's question and the modified questions; and a detection module configured to detect at least one among the searched candidate answers as an answer.

According to another aspect of the present invention, there is provided a paraphrase module, including: an analysis unit configured to analyze a user's question; and a conversion unit configured to perform at least one of an operation of substituting a word or a phrase of another language for a word or a phrase included in the user's question, and an operation of changing a sentence structure of the user's question and substituting a synonym for the word included in the user's question, and generate a plurality of modified questions in which the user's question is paraphrased, wherein the user's question and the plurality of modified questions are provided to a plurality of question answering engines.

According to still another aspect of the present invention, there is provided a natural language question answering method by a natural language question answering system, including: generating a plurality of modified questions by paraphrasing a user's question; receiving each of the user's question and the modified questions by a plurality of question answering engines, and selecting candidate answers corresponding to each of the user's question and the modified questions; and detecting at least one among the searched candidate answers as an answer.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 3A and 3B are diagrams illustrating an operation of detecting an answer to a user's question according to an embodiment of the present invention.

DETAILED DESCRIPTION OF EXEMPLARY EMBODIMENTS

The above and other objects, features and advantages of the present invention will become more apparent with reference to exemplary embodiments which will be described hereinafter with reference to the accompanying drawings. However, the present invention is not limited to exemplary embodiments which will be described hereinafter, and can be implemented by various different types.

Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, but the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Figure 1:
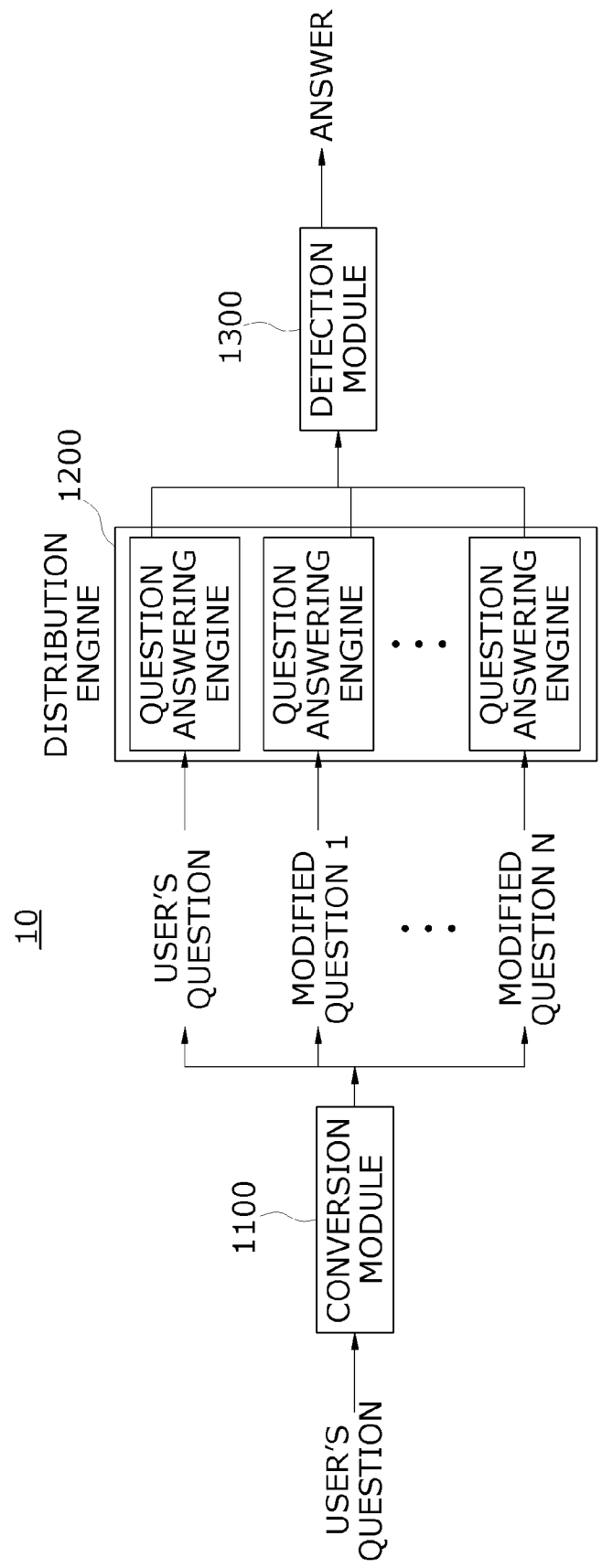
FIG. 1 is a diagram illustrating a natural language question answering system according to an embodiment of the present invention.

Hereinafter, exemplary embodiments of the present invention will be described in detail with reference to the accompanying drawings. FIG. 1 is a diagram illustrating a natural language question answering system according to an embodiment of the present invention.

As shown in FIG. 1, a natural language question answering system 10 according to an embodiment of the present invention may include a conversion module 1100, a distribution engine 1200, and a detection module 1300. The natural language question answering system 10 according to an embodiment of the present invention may further include a suggestion module (not shown) of suggesting a detected answer.

The conversion module 1100 may paraphrase a user's question, and generate a plurality of modified questions.

In detail, the conversion module 1100 may perform at least one among operations of substituting a word or a phrase of another language for a word or a phrase included in the user's question, converting a sentence structure of the user's question, and substituting a synonym for the word included in the user's question, and generate the plurality of modified questions having various sentence structures and words having the same meaning as the user's question.

In this case, the conversion module 1100 may confirm reliability of the plurality of modified questions, and select the plurality of modified questions by considering the reliability. An operation in which the conversion module 1100 generates the plurality of modified questions will be described below with reference to FIG. 2.

The conversion module 1100 may provide the user's question and the plurality of modified questions to the distribution engine 1200. In this case, when the number of the user's question and the plurality of modified questions is equal to or more than the number of a plurality of question answering engines, the conversion module 1100 may transmit the user's question and the plurality of modified questions over a plurality of times.

The distribution engine 1200 may include the plurality of question answering engines, each question answering engine may receive the user's question and the plurality of modified questions, and search for an candidate answer corresponding to the question from a database which is previously set.

In detail, each question answering engine may calculate a reliability value indicating a possibility in which the candidate answers which are simultaneously or sequentially extracted while searching for the candidate answers are the answer, arrange a plurality of candidate answers in a descending sequence based on the reliability value, and select and output N high-ranked candidate answers among the plurality of candidate answers. In this case, each question answering engine may calculate the reliability value of the candidate answers using various techniques such as the reliability of the user's question and the modified question, a similarity value between the sentence from which the candidate answer is extracted and the input question, a support evidence score, etc.

For example, the distribution engine 1200 may detect the candidate answer to the user's question and the plurality of modified questions from the Web such as a portal site, etc.

The detection module 1300 may detect at least one candidate answer having high reliability among the searched candidate answers as the answer.

In detail, the detection module 1300 may detect the candidate answer having the highest reliability among the candidate answers as the answer using the candidate answers transmitted from the plurality of question answering engines and the reliability value of each candidate answer.

Alternatively, since the candidate answer which is most frequently included among the searched candidate answers has a high possibility which is the answer suitable for the user's question, the detection module 1300 may select the candidate answer which is most frequently included among the searched candidate answers as the answer. An operation in which the detection module 1300 selects the answer among the candidate answers will be described hereinafter with reference to FIGS. 3A and 3B.

For example, the suggestion module (not shown) may provide the detected answer to the user using a display means.

In summary, an embodiment of the present invention may paraphrase the user's question as various sentence structures and words based on not the redundancy of the content but the redundancy of the question under the assumption that the question of the same meaning having the same sentence structure and word as the sentence or the paragraph in which the answer is included is made by paraphrasing the user's question, and as a result, extract the answer in the content having the sentence structure and word similar to the generated modified questions.

According to the construction, an embodiment of the present invention may solve the decrease of the recall ratio capable of occurring in an environment of performing a natural language question answering based on not the big data but the limited content, and increase the accuracy of the question answering by selecting the answer capable of satisfying various questions having the same meaning.

Further, an embodiment of the present invention may further improve the performance of the natural language question answering when being applied to the content corresponding to the big data.

Figure 2:
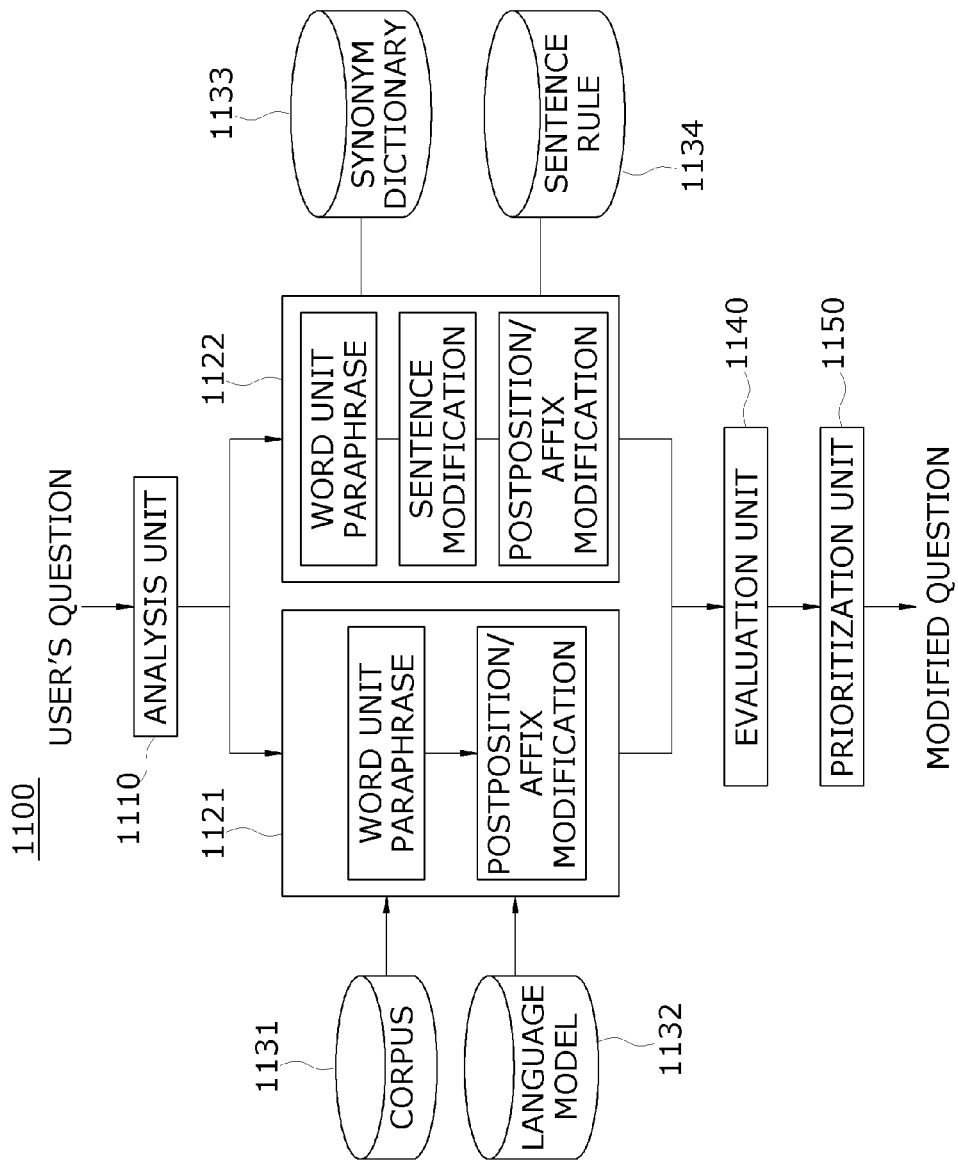
FIG. 2 is a diagram illustrating a conversion module according to an embodiment of the present invention.

Hereinafter, the conversion module according to an embodiment of the present invention will be described with reference to FIG. 2. FIG. 2 is a diagram illustrating a conversion module according to an embodiment of the present invention.

As shown in FIG. 2, the conversion module 1100 according to an embodiment of the present invention may include an analysis unit 1110, first to fourth databases 1131 to 1134, a first conversion unit 1121, a second conversion unit 1122, an evaluation unit 1140, and a prioritization unit 1150.

The analysis unit 1110 may perform a high precision natural language analysis such as a morpheme analysis, an object name recognition, and a sentence structure analysis, etc. on the user's question, and as a result, recognize the morpheme, the object name, and the structure of the sentence.

Here, the morpheme analysis may be an analysis of recognizing a minimum unit of a morphologic level of the language of assigning a function of the meaning. That is, the analysis unit 1110 may recognize the morpheme included in the user's question through the morpheme analysis.

Further, the object name recognition may be an operation of automatically recognizing the name (the object name) of a real object of existing in the real world such as a company name, a person's name, a region name, a movie name, etc. For example, the analysis unit 1110 may automatically recognize that the word "Apple" indicates not a fruit but a company when there is the word "Apple" among the morphemes recognized through the object name recognition.

The sentence structure analysis may be an operation of determining the structure of the sentence by dividing a relation between an artificial language and the natural language into a smaller basic unit, and of setting a relation between the smaller basic units. That is, the analysis unit 1110 may confirm the sentence structure of the morpheme, etc. in the user's question and the relation therebetween through the sentence structure analysis.

As a result, the analysis unit 1110 may transmit the morpheme, the object name, the result of the sentence structure analysis, and the user's question to the first conversion unit 1121 and the second conversion unit 1122.

The first database 1131 may be a bilingual corpus, and store a pair of a Korean word (phrase) and an English word (phrase) evaluated as having the same meaning such as word-word and idiom-idiom. Further, the first database 1131 may store at least one of a usage frequency or statistics information of the pair of the Korean word (phrase) and the English word (phrase).

Here, the corpus may be a word bunch or a word chunk, be a large amount language database of storing a voice language of a human in a computer having a large capacity and using for a language study by processing the stored voice language according to the need, and be collected from the big data. The corpus in the present invention may be a database for various languages, but the corpus using bilingual including a Korean-English translation corpus will be described as an example of the present invention.

The first conversion unit 1121 may be a statistics-based model, and perform a paraphrase of a word unit on the morpheme and the object name included in the user's question using data of a pair of a Korean word and an English word on the corpus in the first database 1131. Here, the first conversion unit 1121 may perform the paraphrase of not only the word unit but also a phrase unit based on a phrase which becomes as a dictionary. For example, the first conversion unit 1121 may perform the paraphrase of converting the Korean word or phrase included in the user's question into the English word or phrase.

Also, the first conversion unit 1121 may generate a natural paraphrase question by adding various postpositions or affixes to the paraphrased word using a language model in the second database 1132.

For this, the first conversion unit 1121 may make the word or phrase which statistically corresponds to the same meaning based on the corpus as a dictionary before performing the present invention, and store in the second database 1132 by learning a language model based on the word or phrase made as the dictionary. In other words, the first conversion unit 1121 may store the language model generated by learning what a proper postposition or an end of the word which is added to a noun or a root of word, etc. is in the second database 1132.

The second conversion unit 1122 may be a rule-based model, and convert the word or phrase included in the user's question into a synonym to be suitable for a predetermined rule based on a synonym dictionary stored in the third database 1133. Also, the second conversion unit 1122 may convert the sentence structure of the user's question into which the word or phrase is converted based on a sentence rule stored in the fourth database 1134 into an active/passive sentence. In this case, the second conversion unit 1122 may search for the synonym of the word or phrase included in the user's question by referencing the recognized object name.

The second conversion unit 1122 may generate the natural paraphrase question by performing a postprocessing of grammatically correcting the postposition and the affix in the questions generated by substituting the synonym and changing the sentence structure using a language model stored in the second database 1132. For this, the second conversion unit 1122 may learn what the proper postposition or end of the word added to the noun or the root of word, etc. is based on the corpus in advance.

The evaluation unit 1140 may receive the paraphrase question from the first conversion unit 1121 and the second conversion unit 1122, and calculate the reliability value through a verification which is previously set.

In detail, the evaluation unit 1140 may manually or automatically confirm meaning preservation, grammar preservation, and expression popularity, etc. of the paraphrase question with respect to an original question (the user's question), and calculate the reliability value. Hereinafter, a method in which the evaluation unit 1140 confirms the meaning preservation, the grammar preservation, and the expression popularity will be described.

First, the meaning preservation may be how much degree the paraphrase question preserves the meaning of the original question. Accordingly, the evaluation unit 1140 may confirm the meaning preservation of the paraphrase question by measuring a similarity between a semantic relation between the words in the original question and a semantic relation between the words in the paraphrase question when performing an automatic evaluation on the meaning preservation.

In detail, the evaluation unit 1140 may statistically process a semantic connectivity of corresponding two words between the original question and the paraphrase question, or confirm whether the two words are a semantic hierarchy relation, or a synonym relation, etc. using a word resource such as a WordNet. Further, the evaluation unit 1140 may calculate a first value of digitizing the meaning preservation by digitizing the semantic similarity.

Next, the grammar preservation may be how much degree the generated sentence is grammatically correct or natural. Accordingly, the evaluation unit 1140 may confirm the grammar preservation of the paraphrase question by measuring how much degree a syntactic limitation or a preference condition of the paraphrase question is matched with case frame information.

Here, the case frame information may be information defining that a word with any meaning is able to be added as subjective, objective, adverbial cases, etc. with respect to a specific predicate. Further, the syntactic limitation or the preference condition is as follows. For example, the case frame may represent that the objective case of "eat" which is a verb in the generated sentence is "food", and the subjective case is "animal". However, what "eat" prefers in the semantic scope of the objective case "food" may be "food excluding liquid". It is because "food of a liquid type" prefers "drink" to "eat". This may be the preference condition. Further, the subjective case of "eat" should be the semantic scope of the "animal", since it is semantically incorrect when the subjective case of "eat" is not "animal"

but "object" such as a stone or metal, and thus this condition may be the limitation condition.

The evaluation unit 1140 may calculate a second value by digitizing the grammar preservation of the paraphrase question based on the confirmation result.

Lastly, the expression popularity may be how much degree the words in the paraphrase question are used by a general user or the content. Accordingly, the evaluation unit 1140 may confirm at least one among a usage frequency and statistics information of each word or phrase from the corpus in the first database 1131, and calculate the first value by digitizing the expression popularity.

The evaluation unit 1140 may calculate the reliability value of the paraphrase question by combining the first value of the meaning preservation, the second value of the grammar preservation, and the third value of the expression popularity of the paraphrase question, and output both the paraphrase question and the reliability value.

Further, the evaluation unit 1140 may calculate the reliability value by considering a weight value provided by the language model with respect to a possibility in which any postposition or end of a word is added to each word. For example, when a possibility in which "A" is added as the end of the word with respect to the specific word is 0.7, each of such values may be considered. Here, when the reliability value of the original question (the user's question) is 1, the reliability value of each modified question is a value which is equal to or more than 0 and less than 1.

The prioritization unit 1150 may receive a plurality of paraphrase questions and their reliability values from the evaluation unit 1140, and prioritize the plurality of paraphrase questions based on the reliability values. The prioritization unit 1150 may select N paraphrase questions which are previously set in a sequence in which the reliability value is great as N modified questions which are used for searching for the answer, and output the N paraphrase questions.

Meanwhile, in the example described above, an example in which the conversion module 1100 includes four databases is described. However, the conversion module 1100 may include the corpus, the language model, the synonym dictionary, the syntax rule, etc. in one database having divided sections. Further, the conversion module 1100 may include two, three, or five or more databases according to its implementation type.

Further, in the example described above, an example in which the conversion module 1100 includes the first conversion unit 1121 and the second conversion unit 1122 performing the paraphrase is described, but the conversion module 1100 may include one or three more conversion units. For example, the second conversion unit 1122 may be configured as a third conversion unit substituting the synonym for the word included in the user's question and a fourth conversion unit changing the sentence structure of the paraphrase question.

Or, in the example described above, a component performing a function of modifying the postposition and the affix in the first conversion unit 1121 and the second conversion unit 1122 may be one or more components which are separately constructed with the first conversion unit 1121 and the second conversion unit 1122.

An embodiment of the present invention may reflect the data redundancy of the conventional natural language question answering in the paraphrase, paraphrase the user's question as various questions having the same meaning, combine the candidate answers extracted by using the paraphrased questions as an input of the question answering engine, and propose the combined candidate answers.

An embodiment of the present invention can improve the recall ratio and the accuracy in the natural language question answering based on the limited content since the paraphrase is performed based on not the redundancy of the content but the redundancy of the question.

Further, an embodiment of the present invention may improve the performance of the natural language question answering by being applied to the content corresponding to the big data.

Hereinafter, an operation of detecting the answer to the user's question will be described according to an embodiment of the present invention with reference to FIGS. 3A and 3B. FIGS. 3A and 3B are diagrams for describing an operation of detecting an answer to a user's question according to an embodiment of the present invention.

In FIGS. 3A and 3B, when the user's question is "who is a Korean provisional government premier assassinated by Ahn Doo-hee?", the conversion module 1100 may generate modified questions 1 and 2 as follows.

Modified question 1: Who is a Korean provisional government premier died by shooting of Ahn Doo-hee?

Modified question 2: Who is a Korean provisional government premier shot and died by Ahn Doo-hee?

Each question answering engine may receive each of the user's question, the modified question 1, and the modified question 2, and search for a candidate answer list to each question shown in FIGS. 3A and 3B, and calculate the reliability with respect to each candidate answer. In this case, the reliability with respect to each candidate answer may be confirmed by the reliability of the database in which a corresponding candidate answer is searched.

As shown in the candidate answer list of FIGS. 3A and 3B, "Kim Gu", "Rhee Sung-man", and "Lyuh Woon-hyung" are proposed as the candidate answers of the original question, "Rhee Sung-man", "Kim Gu", and "Kim Kyu-sik" are proposed as the candidate answers of the modified question 1, and "Kim Gu", "Kim Hak-kyu", and "Rhee Sung-man" are proposed as the candidate answers of the modified question 2.

The detection module 1300 may calculate a combined reliability of each candidate answer using an average value of values obtained by multiplying the reliability value of each question (the user's question and the modified question) and the reliability value of the candidate answer searched as the answer to each question as in the following Equation 1.

$$\text{reliability of candidate answer } a = \frac{\sum_{i=0}^{N} \text{reliability of question } i * \text{reliability of candidate answer } a \text{ to question } i}{N+1} \quad [\text{Equation 1}]$$

Here, N represents a total number of N modified questions.

That is, the detection module 1300 may calculate the combined reliability value combining the reliability values of repeated candidate answers through the Equation 1 since there is the repeated candidate answer among the candidate answers provided from each question answering engine.

As a "combined answer" block located in FIG. 3B, it may be confirmed that "Kim Gu" among the candidate answers has the greatest reliability as 0.678.

As a result, the detection module 1300 may detect "Kim Gu" as the answer to the user's question "who is a Korean provisional government premier assassinated by Ahn Doo-hee?, and the suggestion module (not shown) may output "Kim Gu" to the user.

An embodiment of the present invention may be applied as origin based-technology of the natural language question answering, and be applied to various service fields, for example, intelligent call center Q&A, text big data Q&A, health care Q&A, intelligent robot, smart terminal Q&A, etc. using the natural language as the interface.

Further, since an embodiment of the present invention understands and analyzes the natural language question of the user using the mobile interface of various fields described above by integrating with voice recognition technology and provides desired information, the present invention can greatly contribute to a more intelligent mobile market.

Figure 4:
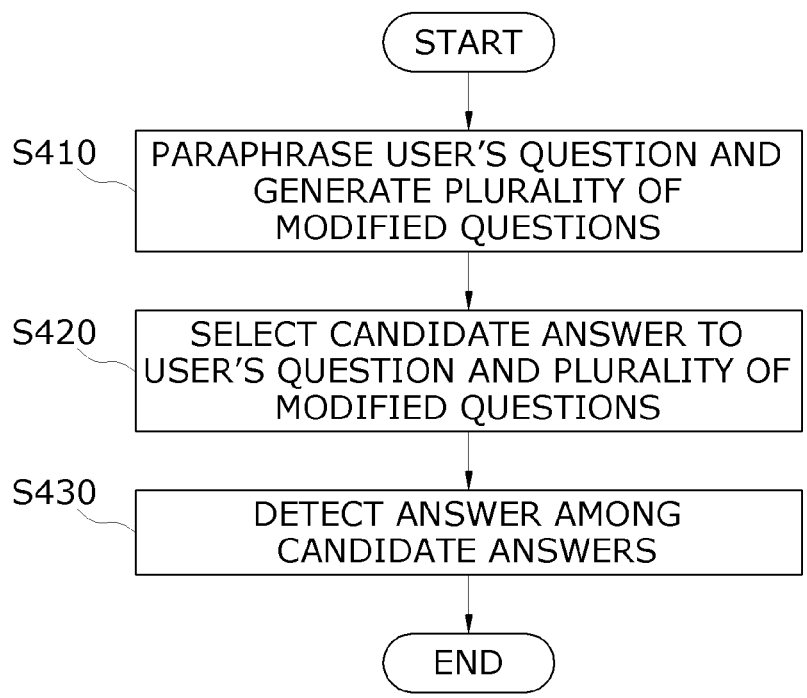
FIG. 4 is a flowchart for describing a natural language question answering method according to an embodiment of the present invention.

Hereinafter, a natural language question answering method according to an embodiment of the present invention will be described with reference to FIG. 4. FIG. 4 is a flowchart for describing a natural language question answering method according to an embodiment of the present invention.

Referring to FIG. 4, the natural language question answering system 10 may generate a plurality of modified questions by paraphrasing a user's question (S410).

In detail, the natural language question answering system 10 may paraphrase the user's question by performing at least one of an operation of substituting a word or phrase of another language for the word or phrase included in the user's question and an operation of substituting the synonym for the word included in the user's question and changing the sentence structure.

Further, the natural language question answering system 10 may confirm at least one among the meaning preservation, the grammar preservation, and the expression popularity, etc. with respect to a plurality of paraphrase questions paraphrasing the user's question, calculate the reliability values of the plurality of paraphrase questions, select N modified questions in a sequence in which the calculated reliability values are great among the plurality of paraphrase questions, and output the N modified questions.

The natural language question answering system 10 may receive the user's question and each modified question by the plurality of question answering engines, and select the candidate answer corresponding thereto (S420).

The natural language question answering system 10 may detect at least one candidate answer among the searched candidate answers as the answer (S430). The natural language question answering system 10 may confirm the candidate answers and the reliability value of each candidate answer transmitted from the plurality of question answering engines, calculate the combined reliability value combining the candidate answer repeated among the candidate answers, and detect the candidate answer in which the combined reliability value is the greatest as the answer.

According to the present invention, the answer may be detected by paraphrasing the user's question.

The above description is merely exemplary embodiments of the scope of the present invention, and it will be apparent to those skilled in the art that various modifications can be made to the above-described exemplary embodiments of the present invention without departing from the spirit or scope of the invention. Accordingly, exemplary embodiments of the present invention are not intended to limit the scope of the present invention but to describe the invention, and the scope of the present invention is not limited by the exemplary embodiments. Thus, it is intended that the present invention covers all such modifications provided they come within the scope of the appended claims and their equivalents.

What is claimed is:

1. A natural language question answering system, comprising:
   one or more processors that process computer executable program code embodied in computer readable storage media, the computer executable program code comprising:
   conversion program code that generates a plurality of modified questions by paraphrasing a user's question;
   question answering engine program code that receives each of the user's question and the modified questions, and select candidate answers corresponding to each of the user's question and the modified questions; and
   detection program code that detects at least one among the searched candidate answers as an answer,
   wherein the conversion program code comprises:
      evaluation program code that confirms at least one among meaning preservation, grammar preservation, and an expression popularity on a plurality of paraphrase questions paraphrasing the user's question, and calculates a reliability value of the plurality of paraphrase questions; and
      prioritization program code that selects N modified questions in a sequence in which the reliability value is great among the plurality of paraphrase questions, and outputs the N modified question, and
   wherein the conversion program code calculates the reliability value of the plurality of paraphrase questions by considering a weight value with respect to a possibility in which a specific postposition or affix is added to a word or a phrase included in the plurality of paraphrase questions from a language model which is previously learned.

2. The natural language question answering system of claim 1, wherein the conversion program code comprises:
   analysis program code that performs at least one among a morpheme analysis, an object name recognition, and a sentence structure analysis on the user's question, wherein the conversion program code paraphrases the user's question using the analysis result of the analysis unit program code.

3. The natural language question answering system of claim 1, wherein the conversion program code performs at least one of an operation of substituting a word or a phrase of another language for a word or a phrase included in the user's question, and an operation of changing a sentence structure of the user's question and substituting a synonym for the word included in the user's question, and generates the plurality of modified questions.

4. The natural language question answering system of claim 1, wherein the conversion program code comprises:
   first conversion program code that confirms a pair of bilingual words or phrases with respect to a word or a phrase included in the user's question based on a corpus and a language model, and performs a paraphrase of a word unit or a phrase unit with respect to the user's question using the pair of the confirmed bilingual word or phrase.

5. The natural language question answering system of claim 1, wherein the conversion program code comprises:
   a second conversion unit configured to perform a paraphrase of changing a sentence structure after substituting a synonym for at least one of a morpheme and an object name in the user's question based on a synonym dictionary.

6. The natural language question answering system of claim 1, wherein the conversion program code generates the plurality of modified questions which are grammatically natural by determining a postposition or an affix which is grammatically proper after paraphrasing a word or a phrase included in the user's question based on a language model which is previously learned.

7. The natural language question answering system of claim 1, wherein the question answering engine program code calculates a reliability value with respect to each candidate answer, and provides a predetermined number of candidate answer lists in a sequence in which the reliability value is great among the candidate answers to the detection module.

8. The natural language question answering system of claim 1, wherein the detection program code combines the candidate answers and the reliability value of each candidate answer transmitted from the question answering engine program code and detects the candidate answer in which the reliability value is greatest among the candidate answers as the answer.

9. A paraphrase module, comprising:
a processor that processes computer executable program code embodied in computer readable storage media, the computer executable program code comprising:
analysis program code that analyzes a user's question; and
conversion program code that performs at least one of an operation of substituting a word or a phrase of another language for a word or a phrase included in the user's question, and an operation of changing a sentence structure of the user's question and substituting a synonym for the word included in the user's question, and generate a plurality of modified questions in which the user's question is paraphrased,
evaluation program code that confirms at least one among meaning preservation, grammar preservation, and an expression popularity on a plurality of paraphrase questions paraphrasing the user's question, and calculates a reliability value of the plurality of paraphrase questions; and
prioritization program code that selects N modified questions which are previously set in a sequence in which the reliability value is great among the plurality of paraphrase questions, and outputs the N modified questions,
wherein the user's question and the plurality of modified questions are provided to question answering engine program code, and
wherein the evaluation program code calculates the reliability value of the plurality of paraphrase questions by considering a weight value with respect to a possibility in which a specific postposition or affix is added to a word or a phrase included in the plurality of paraphrase questions from a language model which is previously learned.

10. The paraphrase module of claim 9, wherein the analysis program code performs at least one among a morpheme analysis, an object name recognition, and a sentence structure analysis on the user's question.

11. The paraphrase module of claim 9, wherein the conversion program code comprises:

first conversion program code that substitutes a word or phrase of another language for a word or a phrase included in the user's question based on a corpus including a pair of bilingual words or phrases.

12. The paraphrase module of claim 9, wherein the conversion program code comprises:
second conversion program code that converts a morpheme included in the user's question into an object name-based synonym which is previously confirmed using a synonym dictionary, and changes a sentence structure with respect to the user's question in which the conversion on the synonym is performed.

13. A natural language question answering method by a natural language question answering system, comprising:
processing by one or more processors computer executable program code embodied in computer readable storage, wherein the computer executable program code:
generates a plurality of modified questions by paraphrasing a user's question;
receives each of the user's question and the modified questions by a question answering engine program code,
selects candidate answers corresponding to each of the user's question and the modified questions; and
detects at least one among the searched candidate answers as an answer,
wherein evaluation program code confirms at least one among meaning preservation, grammar preservation, and an expression popularity on a plurality of paraphrase questions paraphrasing the user's question, and calculates a reliability value of the plurality of paraphrase questions;
wherein prioritization program code selects N modified questions in a sequence in which the reliability value is great among the plurality of paraphrase questions, and outputs the N modified question, and
wherein conversion program code calculates the reliability value of the plurality of paraphrase questions by considering a weight value with respect to a possibility in which a specific postposition or affix is added to a word or a phrase included in the plurality of paraphrase questions from a language model which is previously learned.

14. The natural language question answering method of claim 13, wherein the generating of the plurality of modified questions comprises at least one of:
substituting a word or a phrase of another language for a word or a phrase included in the user's question; and
converting a sentence structure after substituting a synonym for the word included in the user's question.

15. The natural language question answering method of claim 13, wherein the detecting of the at least one among the selected candidate answers as the answer comprises:
confirming the candidate answers and the reliability value of each candidate answer transmitted from the question answering engine program code;
calculating a combined reliability value by combining candidate answers repeated among the candidate answers; and
detecting the candidate answer in which the combined reliability value is the greatest as the answer.

* * * * *